(12) United States Patent
Baxi et al.

(10) Patent No.: US 10,645,470 B2
(45) Date of Patent: May 5, 2020

(54) WEARABLE APPARATUS FOR MEASUREMENTS OF A USER'S PHYSIOLOGICAL CONTEXT

(71) Applicant: Intel Corporation, Santa Clara, CA (US)

(72) Inventors: Amit S. Baxi, Thane (IN); Vincent S. Mageshkumar, Navi Mumbai (IN)

(73) Assignee: INTEL CORPORATION, Santa Clara, CA (US)

( * ) Notice: Subject to any disclaimer, the term of this patent is extended or adjusted under 35 U.S.C. 154(b) by 848 days.

(21) Appl. No.: 15/149,787

(22) Filed: May 9, 2016

(65) Prior Publication Data

US 2017/0325008 A1    Nov. 9, 2017

(51) Int. Cl.
*H04Q 9/00*       (2006.01)
*H04B 1/3827*    (2015.01)

(52) U.S. Cl.
CPC ............... *H04Q 9/00* (2013.01); *H04B 1/385* (2013.01); *H04Q 2209/40* (2013.01); *H04Q 2209/86* (2013.01)

(58) Field of Classification Search
CPC ....... H04Q 9/00; H04Q 2209/40; H04B 1/385
See application file for complete search history.

(56) References Cited

U.S. PATENT DOCUMENTS

| | | | |
|---|---|---|---|
| 5,131,390 A * | 7/1992 | Sakaguchi | A61B 5/4261 600/346 |
| 2011/0259555 A1 * | 10/2011 | Yang | F28D 15/0233 165/104.26 |
| 2017/0014067 A1 * | 1/2017 | Peppou | A61B 5/4266 |
| 2017/0356079 A1 * | 12/2017 | Peng | C23C 14/24 |

OTHER PUBLICATIONS

Coyle, S., et al.,"Textile Sensors to Measure Sweat pH and Sweat-rate During Exercise," C2009 3rd International Conference on Pervasive Computing Technologies for Healthcare, Apr. 1-3, 2009, 6 pages.

Salvo, P., et al.,"A Wearable Sensor for Measuring Sweat Rate," IEEE Sensors Journal, vol. 10, No. 10, Oct. 2010, 2 pages.

VapoMeter "Practical and reliable TEWL, evaporation and permeability measurements," <<http://www.delfintech.com/en/product_information/vapometer/>> [[last visited May 9, 2016]], 3 pages.

* cited by examiner

*Primary Examiner* — Amine Benlagsir
(74) *Attorney, Agent, or Firm* — Schwabe, Williamson & Wyatt, P.C.

(57) ABSTRACT

Embodiments of the present disclosure provide techniques and configurations for an apparatus for opportunistic measurements of a user's physiological context, such as evaporation rate. In one instance, an apparatus may include a chamber with a first side and a second side opposite the first side. The chamber may be disposed with the first side in proximity to or in contact with a surface (e.g., body of the user). The first side may include a first opening to allow evaporation from the surface to enter the chamber. The chamber may include a second opening to allow the evaporation to exit the chamber. The chamber may further include first and second sensors (e.g., humidity sensors) disposed inside the chamber, to detect the evaporation from the surface. The apparatus may be configured to measure the evaporation based on evaporation readings provided by the sensors. Other embodiments may be described and/or claimed.

19 Claims, 5 Drawing Sheets

WEARABLE APPARATUS FOR MEASUREMENTS OF A USER'S PHYSIOLOGICAL CONTEXT

FIELD

Embodiments of the present disclosure generally relate to the field of wearable devices, and more particularly, to sensor devices for providing opportunistic measurements of a user's physiological context.

BACKGROUND

Sensing of a user's physiological context may provide continuous information about the user's biological and mental state, behavior and preferences so long as the user is using the device for other everyday needs. This information may be used by context-aware applications for personalization related to a user's state of health, such as coaching, alerting, chronic disease management, personalized medicine, and the like. Today's proliferation of wearable computing/communication devices may provide opportunity for sensing of a user's physiological context. However, determination of the user's physiological context may consume a substantial amount of the user's time and effort and may require using substantial energy, hardware, and computing resources. For example, measurements of a user's sweat rate may require the use of special equipment, may have to be performed in special conditions (e.g., in a laboratory), and may not always be performed in real-time, opportunistic or continuous fashion.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
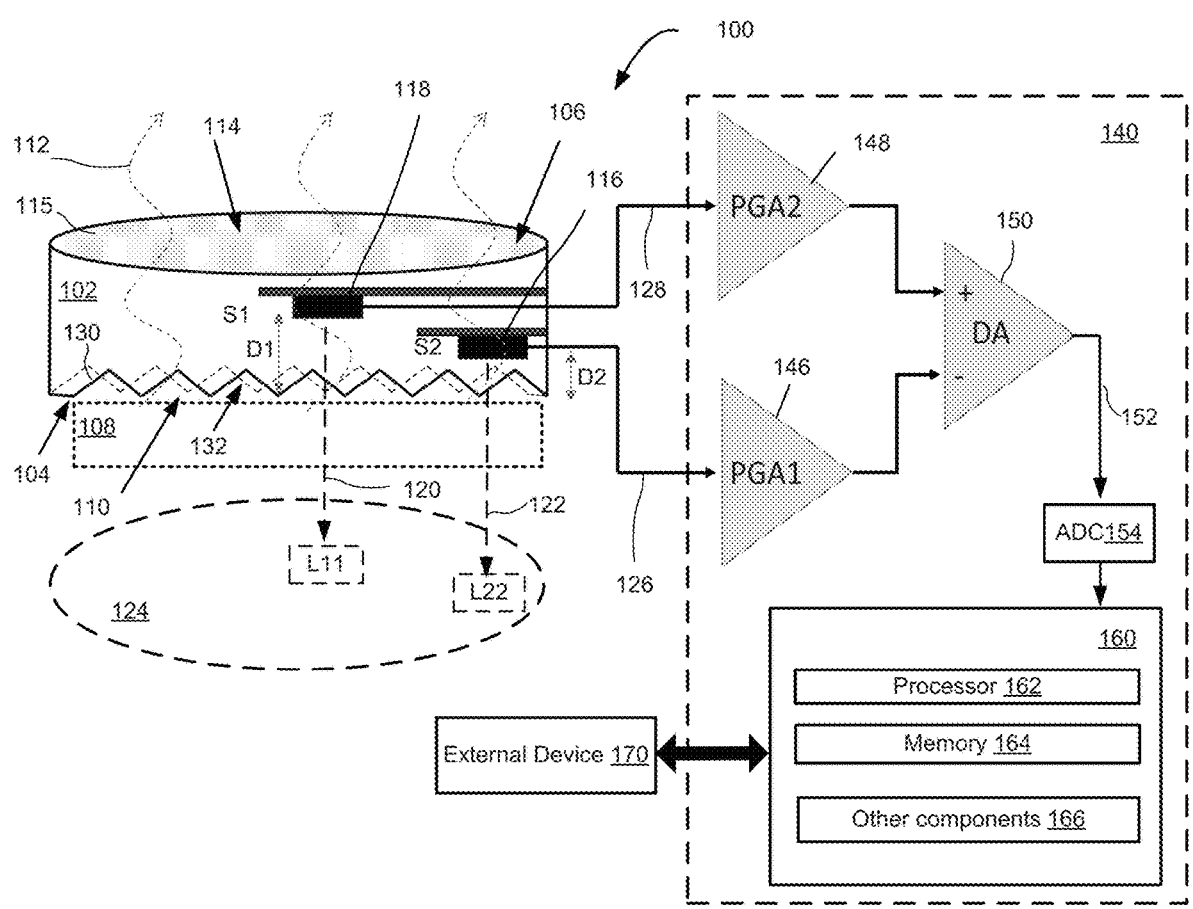
FIG. 1 is an example block diagram illustrating an apparatus for collection of measurements of a user's physiological context, incorporated with the teachings of the present disclosure, in accordance with some embodiments.

Embodiments of the present disclosure include techniques and configurations for collection of measurements of a user's physiological context using a wearable computing/communication apparatus (hereinafter, simply wearable device). The collection of measurements may include opportunistic, continuous, and real-time collection of measurements of the user's physiological context, e.g., during the user's wearing the device.

In accordance with embodiments, an apparatus for opportunistic collection of measurements of a user's physiological context, such as evaporation rate (e.g., sweat evaporation rate), may include a chamber with a first side and a second side opposite or orthogonal to the first side. The chamber may be configured to be disposed with the first side in proximity to or in contact with a surface (e.g., body of the user). The first side may include a first opening to allow evaporation from the surface to enter the chamber. The chamber may include a second opening to allow the evaporation to exit the chamber. The chamber may further include first and second sensors (e.g., humidity sensors) disposed inside the chamber, to detect the evaporation from the surface. The apparatus may be configured to measure the evaporation based at least in part on evaporation readings provided by the first and second sensors.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct or indirect contact.

FIG. 1 is an example block diagram illustrating an apparatus for collection of measurements of a user's physiological context, incorporated with the teachings of the present disclosure, in accordance with some embodiments. In embodiments, the apparatus 100 may comprise a wearable device, such as a wristwatch or wristband-based device. The apparatus 100 may be configured to measure evaporation, such as evaporation (e.g., sweat) rate, of the user's body, using at least two humidity sensors placed at different positions inside the device. The device may include at least two openings, to allow evaporation (e.g., water vapor) to enter the device, be detected by the sensors at different locations inside the device, and exit the device.

While the example embodiments described herein are related to wearable devices and may be used for measurements of the user's evaporation rate, other applications may be contemplated. For example, the embodiments of the apparatus 100 may be used in an industrial environment, such as to measure wetness (or dryness) levels of different surfaces.

In embodiments, the apparatus 100 may include a chamber 102 (e.g., in a form of an enclosure) with a first side 104 and a second side 106 opposite the first side 104. While the enclosure forming the chamber 102 is shown to have a substantially cylindrical shape, other substantially enclosed shapes may also be considered. The chamber 102 may be configured to be disposed with the first side 104 in proximity to or in contact with a surface 108 (shown in dashed lines). In embodiments, the surface 108 may comprise a portion of a body of a user, such as a skin surface. For example, the apparatus 100, such as a wearable device, may be strapped to the user's skin with the first side 104 facing the skin.

The first side 104 may include an opening 110 to allow evaporation 112 from the surface 108 to enter the chamber 102. In embodiments, the chamber 102 may further include an opening 114 on second side 106 to allow the evaporation 112 to exit the chamber 102. In embodiments, the opening 114 may be covered by a partially open cover 115, such as thin, perforated mesh to protect the inside of the chamber 102 from dust, wind, and other influences of the external environment. However, cover 115 cannot restrict the free flow of evaporation 112 from the surface 108. In embodiments, the chamber 102 may include an undulating or zigzag-shaped edge 130 that may define in part the first side 104 of the chamber 102, to form one or more openings 132. The openings 132 may allow free flow of air from the external ambient environment, through the chamber 102 and back to the ambient environment. The described chamber structure may facilitate sweat evaporation from the skin surface 108 under the chamber 102. In alternate embodiments, the openings 132 may be formed with other perforated structures. The opening 114 may also have perforated structures analogous to edge 130. In still other embodiments, the exit openings may be disposed at the side orthogonally connecting the first side 104 and second side 106 instead.

The apparatus 100 may further include sensors 116, 118 disposed inside the chamber 102, to detect evaporation from the surface 108. In embodiments, sensors 116, 118 may comprise humidity sensors configured to detect evaporation and output corresponding readings, such as voltage. As shown, the sensors 116, 118 may be disposed inside the chamber 102 at different distances D1 and D2 respectively from the first side 104. In embodiments, distances D1 and D2 may comprise about 10 mm and 5 mm respectively.

In embodiments, the sensors 116, 118 may be further disposed inside the chamber 102 at different respective locations (spaces) S1 and S2. For example, the spaces S1 and S2 of the sensors 116, 118' placement inside the chamber 102 may have partially overlapping or non-overlapping imprints L11 and L22 when projected (as indicated by arrows 120, 122) onto an imaginary cross-sectional plane 124 of the chamber 102. Such placement of the sensors 116, 118 may provide for unobtrusive detection of evaporation 112 by each sensor inside the chamber 102.

The disposition of the sensors 116, 118 at different distances from first side 104 inside the chamber 102 may provide for accurate measurements of evaporation, based on evaporation gradient. Water vapor (e.g., sweat) may evaporate from the surface (e.g., user's skin) and flow away from it. The corresponding water vapor pressure differential as detected by sensors 116, 118 may be proportional to sweat rate, and is governed by Fick's Law of Diffusion. The vapor flow rate may be proportional to the amount of moisture on the skin surface (i.e., sweat). Placing the sensors 116, 118 close to skin surface 108, but at varying distances D1 and D2 from the skin may create a vapor pressure gradient. The differential humidity (dH) along the vaporization gradient may be proportional to the evaporation rate and therefore also proportional to the amount of humidity (sweat) on skin surface 108. Accordingly, the sensors 116, 118 may each provide respective output signals 126, 128, such as voltages, indicative of (e.g., proportional to) evaporation at their respective locations S1, S2 inside the chamber 102.

The apparatus 100 may further comprise electronic circuitry 140 coupled with the sensors 116, 118 and configured to receive and process their respective readings (voltages 126, 128), to produce the measurements of evaporation rate. As shown, the output voltage signals 126, 128 may be provided to respective inputs of programmable gain amplifiers (PGA1 and PGA2) 146, 148. The output voltages may be amplified by PGA1 and PGA2 and then connected to a differential amplifier (DA) 150, which may provide a differential voltage output 152 proportional to the evaporation rate or sweat rate.

The differential voltage output 152 may be provided (e.g., via an analog-to-digital converter (ADC) 154) to a processing block 160 configured to receive the output 152 and produce the evaporation rate, based at least in part on the received differential voltage output. In some embodiments, the processing block 160 may include a processor 162 configured to process the readings provided to the circuitry 140. The processing block 160 may further include memory 164 having instructions that, when executed on the processor 162, may cause the processor 162 to perform signal processing and provision of evaporation rate or other evaporation parameters. The processor 162 may be implemented as having multi-cores, e.g., a multi-core microprocessor. Memory 164 may be temporal and/or persistent storage of any type, including, but not limited to, volatile and non-volatile memory, optical, magnetic, and/or solid state mass storage, and so forth.

The circuitry 140 may include other components 166 necessary for the functioning of the apparatus 100. For example, other components 166 may include a transceiver to communicate the user's physiological context measurements over one or more wired or wireless network(s) with any other suitable device, such as external computing device 170. In embodiments, the processing block 160 may comprise a system on chip (SoC) or system in package (SiP). In embodiments, the circuitry 140 may be disposed on a printed circuit board (PCB) communicatively coupled with the sensors 116, 118.

The described embodiments of the apparatus 100 may provide substantial advantages over existing solutions. The described embodiments may provide for unobtrusive, real-time, continuous measurement of sweat rate in regular living conditions, outside a controlled lab environment. In contrast to conventional solutions, the described embodiments may not require a cooling-off period between measurements. The sensors employed in the described embodiments may comprise conventional, off-the-shelf, humidity sensors.

The described embodiments may further provide for direct and continuous measurements of evaporation (e.g., sweat) rate, in contrast to indirect estimates of evaporation offered by conventional solutions. Using dual humidity sensors and a chamber with openings as described in reference to FIG. 1 may enable free flow of water vapor from the skin surface. The advantage of this approach is that there may be no need to remove the apparatus from the body after a measurement to enable the humidity sensors to achieve equilibrium with the ambient environment, thereby enabling continuous, real-time sensing of evaporation rate.

Further, using dual humidity sensors, which may always be at equilibrium with the ambient environment, may enable more precise measurement of differential evaporation rate, without the influence of ambient environment. The changes in ambient environment may appear in the signals 126, 128 provided by humidity sensors, and may be subtracted at the DA 150, providing the resulting signal 152 with substantial indifference to the environmental changes.

The described embodiments may be more user-friendly and safe vis-à-vis existing solutions because they may not require injections of electrical currents into the body in order to provide the requisite measurements, which are utilized by conventional solutions. Further, the described embodiments may be sensitive to a broad range of sweat rates, such as low sweat rates associated with low intensity physical activities.

Figure 2:
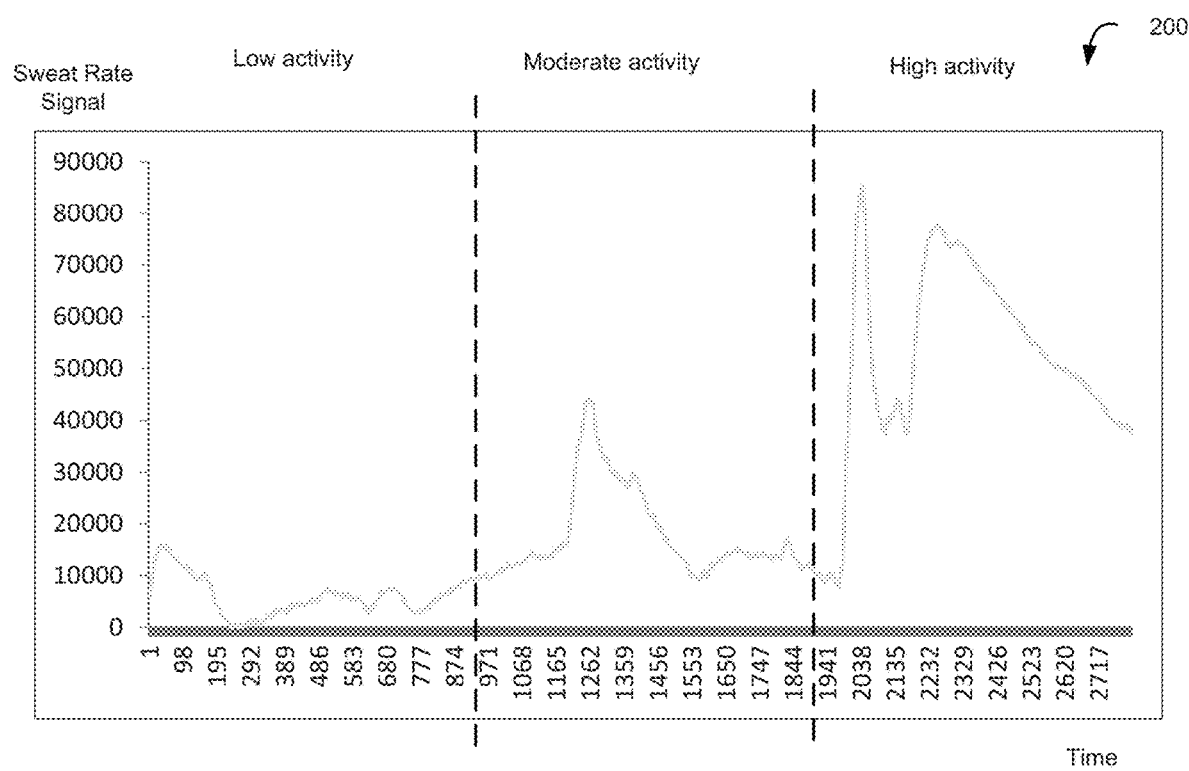
FIG. 2 is an example graph illustrating sensitivity performance of the apparatus of FIG. 1 in response to different levels of physical activity of the user, in accordance with some embodiments.

FIG. 2 is an example graph illustrating sensitivity performance of the apparatus of FIG. 1 in response to different levels of physical activity of the user, in accordance with some embodiments. The graph 200 provides the measurements of the voltage output signal 152 (see FIG. 1), indicative of sweat rate, as function of time. The measurements are shown as taken for different levels of physical activity of the user: low (e.g., sedentary), moderate (e.g., walking), and high (e.g., climbing up a staircase). As shown, the apparatus described herein may be sensitive to minute sweat rate changes even during sedentary and moderate-speed walking activities, in contrast to conventional solutions that may not be sensitive enough to low and moderate intensity activities and may typically pick up sweating only for high intensity activities.

In contrast to commercially available devices, the described embodiments may comprise wearable devices, which may enable continuous measurements of sweat rates without manual intervention. For example, the described embodiments may be incorporated in conventional smartwatch or wristwatch designs.

Figure 3:
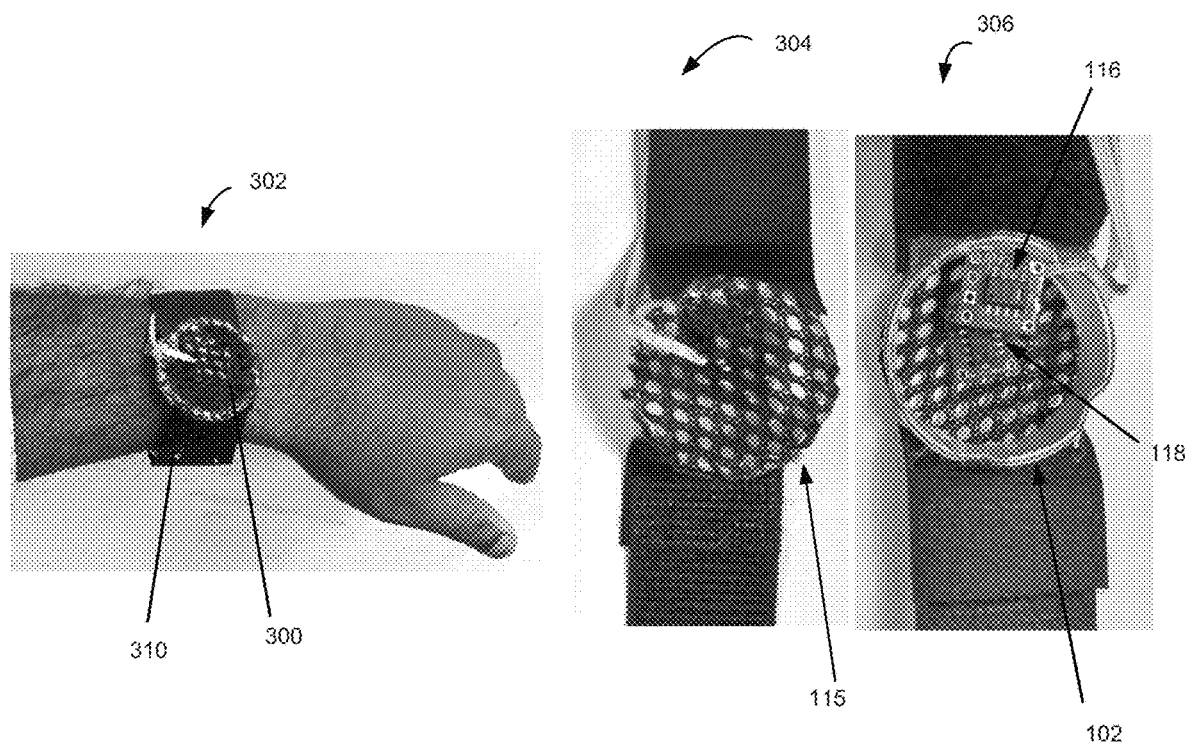
FIG. 3 illustrates different example views of a wearable device configured with circuitry to collect measurements of a user's physiological context, in accordance with some embodiments.

FIG. 3 illustrates different example views of a wearable device configured with circuitry to collect measurements of a user's physiological context, in accordance with some embodiments. The like components of FIGS. 1 and 3 are denoted with like numerals, for ease of understanding.

View 302 illustrates an example embodiment of a wearable device 300 provided in accordance with embodiments described in reference to FIG. 1. The device 300 is shown as attached to the user's wrist with a wrist strap 310. The wrist strap 310 may be used to wear the device 300 on the wrist like a wristwatch, although other implementations are possible: for example, the wearable device 300 may be strapped to other portions of the user's limbs or the user's neck, for example.

View 304 shows an example top view of the wearable device 300. As shown, the perforated mesh 115 may be employed to aid easy evaporation of sweat off the user's skin.

View 306 shows an example bottom (skin side) view of the wearable device 300. As shown, two sensors 116, 118 (humidity sensors) may be mounted inside the cylinder-shaped chamber 102, as described in reference to FIG. 1, to be placed at different distances from the skin.

As discussed above, the described embodiments may be integrated inside a wristwatch, such as a smartwatch, for example.

Figure 4:
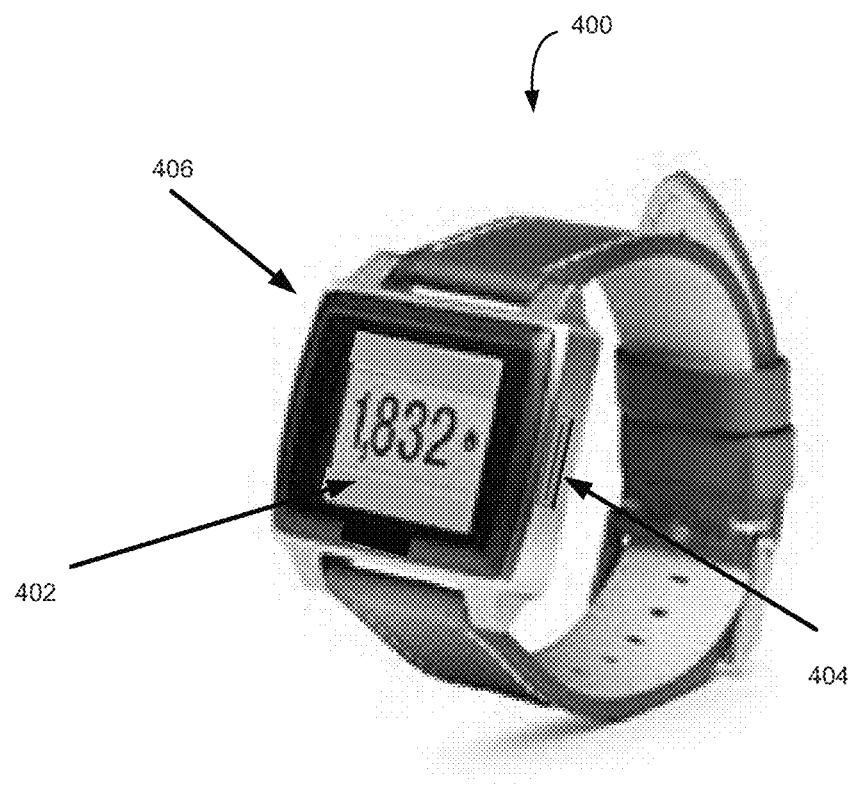
FIG. 4 illustrates an example embodiment of the apparatus for collecting measurements of a user's physiological context incorporated in a wristwatch, in accordance with some embodiments.

FIG. 4 illustrates an example embodiment of the apparatus for collection of measurements of a user's physiological context incorporated in a wristwatch, in accordance with some embodiments. The like components of FIGS. 1 and 4 are denoted with like numerals, for ease of understanding.

As shown, the wristwatch 400 may have a conventional enclosed upper surface (face) 402, configured to include a display and other electronic components of the wristwatch 400. As described in reference to FIG. 1, the escape route for vapors 112 may be provided by the opening 114 in the side 106 (upper surface) of the chamber 102 of apparatus 100. In the wristwatch embodiment described herein, the escape route for vapors may be provided by the openings 404, such as perforations or slits on an orthogonal side (or sides) of the chamber, which in this example comprises a case 406 of the wristwatch 400. The openings 404 may be covered internally, for example, with a fine mesh (similar to cover 115 or the one used to cover speaker and microphone openings in a conventional smartphone), for dust and water ingress protection.

Figure 5:
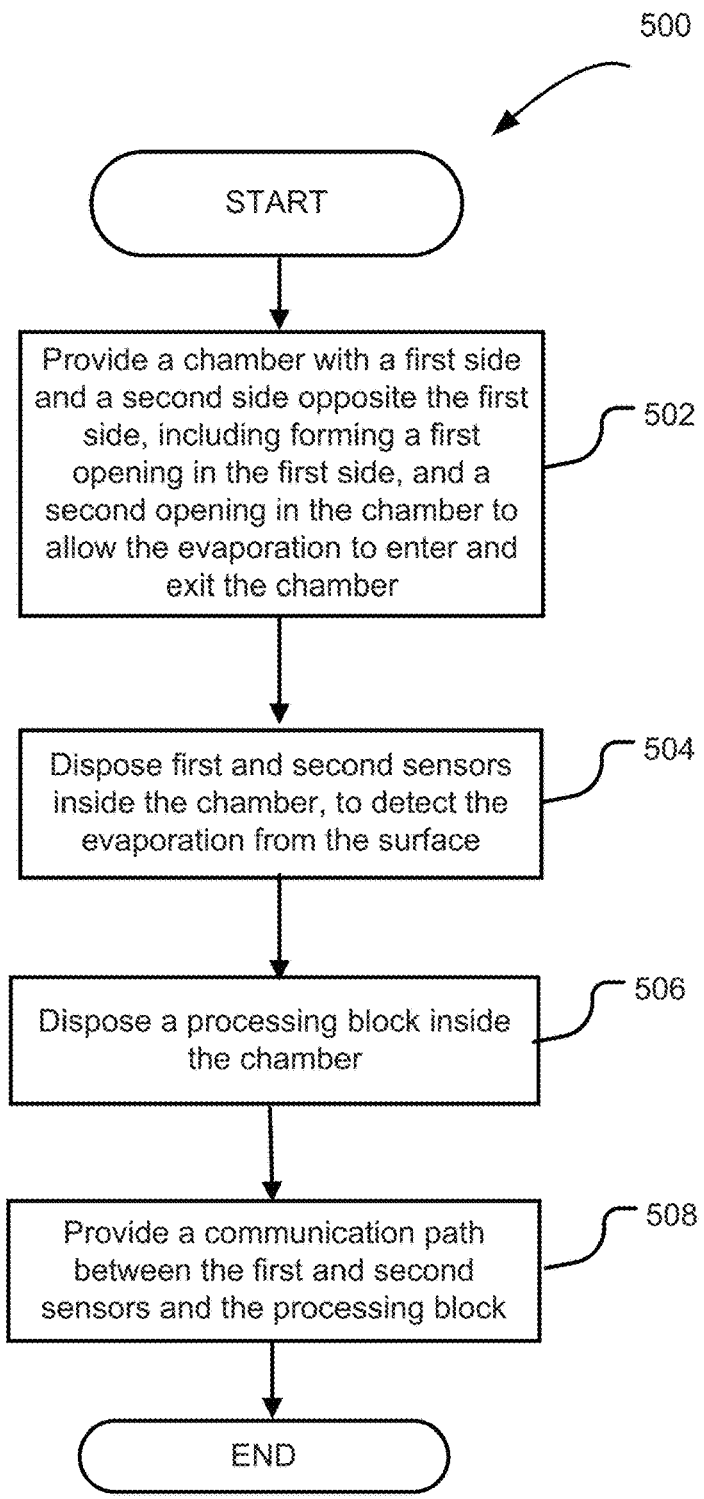
FIG. 5 is an example process flow diagram for fabrication of an apparatus for measurements of a user's physiological context, in accordance with some embodiments.

FIG. 5 is an example process flow diagram for fabrication of an apparatus for measurements of a user's physiological context, in accordance with some embodiments. For ease of understanding, the description of the process 500 will reference the components of the embodiments described in reference to FIG. 1.

At block 502, the process 500 may include providing a chamber (102) with a first side (104) and a second side (106) opposite or substantially orthogonal to the first side, including forming a first opening (110) in the first side, to allow evaporation (112) from a surface (108) in proximity or in contact with the first side to enter the chamber, and forming a second opening (114) in the chamber (e.g., in the second side or an enclosure of the chamber) to allow the evaporation to exit the chamber. One or more additional openings (132) may be disposed in the chamber to allow air to flow into the chamber.

At block 504, the process 500 may include disposing first and second sensors (116, 118) inside the chamber, to detect the evaporation from the surface. Disposing the sensors inside the chamber may include placing the sensors inside the chamber at different distances from the first side. Disposing the sensors may further include placing the sensors inside the chamber at respective spaces inside the chamber, wherein the spaces may have partially overlapping or non-overlapping imprints when projected onto an imaginary cross-sectional plane of the chamber. In embodiments, the sensors may comprise humidity sensors.

At block 506, the process 500 may include disposing a processing block (160) inside the chamber.

At block 508, the process 500 may include providing a communication path (for signals 126, 128) between the sensors and the processing block, to measure the evaporation based at least in part on evaporation readings provided by the sensors to the processing block via the communication path.

The following paragraphs describe examples of various embodiments.

Example 1 may be an apparatus for evaporation measurements, comprising: a chamber with a first side and a second side opposite the first side, wherein the chamber is to be disposed with the first side in proximity to or in contact with a surface, wherein the first side includes a first opening to allow evaporation from the surface to enter the chamber, wherein the chamber includes a second opening to allow the evaporation to exit the chamber; and first and second sensors disposed inside the chamber, to detect and provide readings of the evaporation from the surface, wherein the apparatus is to measure the evaporation based at least in part on the evaporation readings provided by the first and second sensors.

Example 2 may include the subject matter of Example 1, wherein the first and second sensors comprise humidity sensors, wherein the apparatus is to measure an evaporation rate based at least in part on a difference between respective evaporation readings provided by the first and second sensors.

Example 3 may include the subject matter of Example 2, further comprising: a first amplifier coupled with the first sensor, to receive the evaporation readings provided by the first sensor and provide a corresponding first voltage; a second amplifier coupled with the second sensor, to receive the evaporation readings provided by the second sensor and provide a corresponding second voltage; and a differential amplifier coupled with the first and second amplifiers, to receive the first and second voltages and output a differential voltage signal that is proportional to the evaporation rate.

Example 4 may include the subject matter of Example 3, further comprising a processing block coupled with the differential amplifier, to: receive the differential voltage signal; and produce the evaporation rate, based at least in part on the differential voltage signal.

Example 5 may include the subject matter of Example 1, wherein the first sensor is disposed inside the chamber at a first distance from the first side, wherein the second sensor is disposed inside the chamber at a second distance from the first side, wherein the first distance is different than a second distance.

Example 6 may include the subject matter of Example 5, wherein the first and second sensors are further disposed inside the chamber at respective first and second spaces inside the chamber, wherein the first and second spaces have partially overlapping or non-overlapping imprints when projected onto an imaginary cross-sectional plane of the chamber.

Example 7 may include the subject matter of Example 1, wherein the chamber includes one or more third openings to allow air to flow into the chamber.

Example 8 may include the subject matter of Example 7, wherein the chamber includes an undulating or zigzag-shaped edge that defines in part the first side of the chamber, to form the one or more third openings.

Example 9 may include the subject matter of any of Examples 1 to 8, wherein the surface comprises a portion of a skin of a user, wherein the apparatus comprises a wearable device.

Example 10 may include the subject matter of Example 9, wherein the portion of a skin comprises a part of a wrist of the user, wherein the wearable device comprises a wristwatch.

Example 11 may include the subject matter of Example 10, wherein the second opening comprises a plurality of slits disposed on an enclosure of the chamber, wherein the chamber comprises a case of the wristwatch.

Example 12 may include the subject matter of Example 9, wherein the second opening is disposed on the second side of the chamber.

Example 13 may include the subject matter of Example 12, wherein the second opening is covered with a mesh, to allow the evaporation to exit the chamber.

Example 14 may include the subject matter of Example 9, wherein the chamber comprises an enclosure with a substantially cylindrical shape.

Example 15 may be a wearable device for evaporation measurements, comprising: a chamber to be disposed in proximity to or in contact with a body of a user, wherein the chamber includes a first opening to allow evaporation from the body to enter the chamber, and a second opening to allow the evaporation to exit the chamber; first and second sensors disposed inside the chamber at different distances from the first opening, to detect the evaporation from the body; and circuitry coupled with the first and second sensors to receive evaporation readings from the first and second sensors, and to determine an evaporation parameter based at least in part on the readings.

Example 16 may include the subject matter of Example 15, wherein the chamber comprises an enclosure, wherein the first opening is be placed in proximity to or in contact with the body, wherein the second opening is disposed opposite the first opening or on a wall of the enclosure.

Example 17 may include the subject matter of Example 15, wherein the first and second sensors comprise humidity sensors, wherein the evaporation parameter comprises an evaporation rate, wherein the circuitry is to determine the evaporation rate based at least in part on a difference between respective evaporation readings provided by the first and second sensors.

Example 18 may include the subject matter of any of Examples 15 to 17, further comprising a strap connected with the chamber, to attach the wearable device to a wrist of the user.

Example 19 may include the subject matter of Example 18, wherein the wearable device comprises a wristwatch.

Example 20 may be a method for evaporation measurements, comprising: providing a chamber with a first side and a second side opposite the first side, including forming a first opening in the first side, to allow evaporation from a surface in proximity or in contact with the first side to enter the chamber, and forming a second opening in the chamber to allow the evaporation to exit the chamber; disposing first and second sensors inside the chamber, to detect the evaporation from the surface; disposing a processing block inside the chamber; and providing a communication path between the first and second sensors and the processing block, to measure the evaporation based at least in part on evaporation readings provided by the first and second sensors to the processing block via the communication path.

Example 21 may include the subject matter of Example 20, wherein the first and second sensors comprise humidity sensors.

Example 22 may include the subject matter of Example 20, wherein disposing first and second sensors inside the chamber includes placing the first sensor inside the chamber at a first distance from the first side, and placing the second sensor inside the chamber at a second distance from the first side, wherein the first distance is different than the second distance.

Example 23 may include the subject matter of Example 22, wherein disposing first and second sensors inside the chamber further includes placing the first and second sensors inside the chamber at respective first and second spaces inside the chamber, wherein the first and second spaces have partially overlapping or non-overlapping imprints when projected onto an imaginary cross-sectional plane of the chamber.

Example 24 may include the subject matter of Example 20, wherein forming a second opening in the chamber includes disposing the second opening in the second side of the chamber or an enclosure of the chamber.

Example 25 may include the subject matter of any of Examples 20 to 24, further comprising forming one or more third openings in the chamber to allow air to flow into the chamber.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
a chamber with a first side and a second side opposite the first side, wherein the chamber is to be disposed with the first side in proximity to or in contact with a surface, wherein the first side includes a first opening to allow evaporation from the surface to enter the chamber, wherein the chamber includes a second opening to allow the evaporation to exit the chamber; and
first and second humidity sensors disposed inside the chamber, to detect and provide readings of the evaporation from the surface, wherein the first and second humidity sensors are disposed inside the chamber at first and second locations, wherein the first and second locations are defined by respective placements of the first and second humidity sensors at different distances from the first side, and further defined by the respective placements of the first and second humidity sensors inside the chamber at first and second spaces inside the chamber, wherein the first and second spaces have partially overlapping or non-overlapping imprints when projected onto an imaginary cross-sectional plane of the chamber, wherein the first and second humidity sensors are to output first and second voltage signals indicative of first and second evaporations at the first and second locations,
wherein the apparatus is to measure the evaporation based at least in part on a difference between the first and second voltage signals indicative of the first and second evaporations provided by the first and second humidity sensors at the first and second locations, and wherein the apparatus comprises a wearable device.

2. The apparatus of claim 1, further comprising:
a first amplifier coupled with the first humidity sensor, to receive the first voltage signal provided by the first humidity sensor and provide a corresponding first amplified voltage;
a second amplifier coupled with the second humidity sensor, to receive the second voltage signal provided by the second humidity sensor and provide a corresponding second amplified voltage; and
a differential amplifier coupled with the first and second amplifiers, to receive the first and second amplified voltages and output a differential voltage signal that is proportional to an evaporation rate.

3. The apparatus of claim 2, further comprising a processing block coupled with the differential amplifier, to:
receive the differential voltage signal; and
produce the evaporation rate, based at least in part on the differential voltage signal.

4. The apparatus of claim 1, wherein the chamber includes one or more third openings to allow air to flow into the chamber.

5. The apparatus of claim 4, wherein the chamber includes an undulating or zigzag-shaped edge that defines in part the first side of the chamber, to form the one or more third openings.

6. The apparatus of claim 1, wherein the surface comprises a portion of a skin of a user.

7. The apparatus of claim 6, wherein the portion of the skin comprises a part of a wrist of the user, wherein the wearable device comprises a wristwatch.

8. The apparatus of claim 7, wherein the second opening comprises a plurality of slits disposed on an enclosure of the chamber, wherein the chamber comprises a case of the wristwatch.

9. The apparatus of claim 6, wherein the second opening is disposed on the second side of the chamber.

10. The apparatus of claim 9, wherein the second opening is covered with a mesh, to allow the evaporation to exit the chamber.

11. The apparatus of claim 6, wherein the chamber comprises an enclosure with a substantially cylindrical shape.

12. A wearable device, comprising:
a chamber to be disposed in proximity to or in contact with a body of a user, wherein the chamber includes a first opening to allow evaporation from the body to enter the chamber, and a second opening to allow the evaporation to exit the chamber;
first and second vapor sensors disposed inside the chamber at different distances from the first opening, to detect the evaporation from the body, wherein the first and second vapor sensors are disposed inside the chamber at first and second locations, wherein the first and second locations are defined by respective placements of the first and second vapor sensors at the different distances from the first opening, and further defined by the respective placements of the first and second vapor sensors inside the chamber at first and second spaces inside the chamber, wherein the first and second spaces have partially overlapping or non-overlapping imprints when projected onto an imaginary cross-sectional plane of the chamber, wherein the first and second vapor sensors are to output first and second voltage signals indicative of first and second evaporations at the first and second locations, and
circuitry coupled with the first and second vapor sensors to receive the first and second voltage signals indicative of the first and second evaporations from the first and second vapor sensors, and to determine an evaporation parameter based at least in part on a difference between the first and second voltage signals.

13. The wearable device of claim 12, wherein the chamber comprises an enclosure, wherein the first opening is be placed in proximity to or in contact with the body, wherein the second opening is disposed opposite the first opening or on a wall of the enclosure.

14. The wearable device of claim 12, wherein the evaporation parameter comprises an evaporation rate.

15. The wearable device of claim 12, further comprising a strap connected with the chamber, to attach the wearable device to a wrist of the user.

16. The wearable device of claim 15, wherein the wearable device comprises a wristwatch.

17. A method, comprising:
providing in a wearable device a chamber with a first side and a second side opposite the first side, including forming a first opening in the first side, to allow evaporation of sweat from a skin surface in proximity or in contact with the first side to enter the chamber, and forming a second opening in the chamber to allow the evaporation of the sweat to exit the chamber;

disposing first and second moisture sensors inside the chamber, to detect the evaporation of the sweat from the skin surface, including placing the first and second moisture sensors inside the chamber at first and second locations, wherein the first and second locations are defined by respective placements of the first and second moisture sensors at different distances from the first opening, and further defined by the respective placements of the first and second moisture sensors inside the chamber at first and second spaces inside the chamber, wherein the first and second spaces have partially overlapping or non-overlapping imprints when projected onto an imaginary cross-sectional plane of the chamber, wherein the first and second moisture sensors are to output first and second voltage signals indicative of first and second evaporations at the first and second locations;

disposing a processing block inside the chamber; and providing a communication path between the first and second moisture sensors and the processing block, to measure the evaporation of the sweat from the skin surface based at least in part on the first and second voltage signals indicative of the first and second evaporations, provided by the first and second moisture sensors to the processing block via the communication path.

18. The method of claim 17, wherein forming the second opening in the chamber includes disposing the second opening in the second side of the chamber or an enclosure of the chamber.

19. The method of claim 17, further comprising forming one or more third openings in the chamber to allow air to flow into the chamber.

* * * * *